April 18, 1967     E. R. DAVIS ETAL     3,314,388

SIDE SEAM SEAL FOR METAL CONTAINERS

Filed June 23, 1964

INVENTORS
EVERETT R. DAVIS
DONALD D. HUNDT
EDWARD W. MERRILL

BY

AGENT

United States Patent Office 3,314,388
Patented Apr. 18, 1967

3,314,388
SIDE SEAM SEAL FOR METAL CONTAINERS
Everett R. Davis, Westwood, Edward W. Merrill, Belmont, and Donald D. Hundt, Arlington, Mass., assignors to W. R. Grace & Co., Cambridge, Mass., a corporation of Connecticut
Filed June 23, 1964, Ser. No. 377,222
4 Claims. (Cl. 113—120)

This invention relates to a system for sealing containers. More particularly, it concerns a dual sealing system for sheet metal containers.

In conventional can manufacturing operations, can bodies are produced from flat sheet metal blanks which are advanced through a series of working stations where the blank is flexed to remove stiffness and then notched at the corners of one or both of its opposed longitudinal edges which are used to form the side seam. Thereafter, the opposed longitudinal edges of the partially formed blanks are reversely bent into oppositely directed body hooks one of which ultimately forms the internal surface of the completed seam and the other which forms the external surface of the completed seam. After the blank is shaped and the internal and external body hooks are interengaged, the can body is expanded to proper size and the interengaged hooks are bumped together to form the completed side seam.

When making can bodies from sheet metal, such as tin plate, a hermetically sealed side seam is obtained by applying solder to the exterior of the seam after the hooked edges of the body have been interengaged and bumped together. The molten solder flows into the seam and bonds the interfolded metal layers to provide the seal. Because of the different types of sheet metal containers in common use and the different types of sealing systems required, several attempts have been made to find a side seam system which will be equally effective for all types of sheet metal containers. With the newer aluminum cans, for instance, soldering has proved impractical so that the side seam is sealed by other means, for example, with an adhesive which is applied to one of the body hooks before they are interlocked.

Various materials have been proposed for use as side seam sealants for sheet metal cans. However, none of these materials has proved altogether satisfactory under the conditions of stress and humidity ordinarily encountered. For instance, adhesives possessing a high tensile modulus (above about 750 pounds per square inch at 100 percent elongation) provide side seam seals that resist high temperature processing and pasteurization up to 260° F. for one hour, but the bonds fail under stress on prolonged exposure to the aqueous contents of the can. Sealants having a low tensile modulus (0 to about 200 pounds per square inch at 100 percent elongation) will retain their initial bond strength during extended periods of exposure to moisture, but the seals often fail under high temperature processing conditions. Because of better moisture resistance of the bond, the low modulus materials have been used more frequently for side seam sealing particularly, for aluminum containers. However, containers sealed with such materials have been limited in their utility since they are not suitable for packaging foods which require pasteurization or processing at elevated temperatures.

It has now been found that solder can be replaced and that the difficulty inherent in each of the adhesive systems previously employed may be eliminated by the use of a dual adhesive system. This two-part system utilizes a high tensile modulus adhesive in combination with a low tensile modulus sealant in the production of a durable side seam for containers. More specifically, the present invention provides a method of forming cemented can body side seams which comprises providing a can body blank having its opposed longitudinal edges reversely bent to form an external body hook and an internal body hook adapted to be interengaged and bumped together to form a side seam, applying a sealant having a low tensile modulus of 0 to about 200 pounds per square inch at 100 percent elongation to the external body hook, applying an adhesive having a high tensile modulus above about 750 pounds per square inch at 100 percent elongation to the internal body hook, interengaging said internal and external body hooks, and thereafter bumping the interengaged body hooks to lock said hooks together.

In the practice of this invention, the can body blanks employed may be any of those conventionally used to form can bodies of cylindrical or other shape having a side seam of normal hooked construction. In forming the body hooks, the opposed longitudinal edges are each bent to an angle which will provide sufficient space between the blank and the free edge of the hook to receive a selected quantity of sealing material. Generally, an angle of approximately 45 degrees on the inside of the hook is satisfactory. Both the low modulus sealant and the high modulus adhesive may be applied along the length of the body hooks using a nozzle or in any other suitable and convenient manner.

The low modulus sealant is applied to the external body hook which froms the outer surface of the seam so that in the completed side seam this material will be situated in that portion of the seam exposed to the can contents. The high modulus adhesive is applied to the internal body hook which forms the inner surface of the seam so that in the completed seal this material will be located in the exterior portion of the seam in contact with the atmosphere. The total quantity of adhesive and sealant used should be sufficient to fill the space between the interlocked metal layers. This space ordinarily totals 4 mils in thickness along the length of the seam irrespective of the thickness of the sheet metal employed. After the adhesive and sealant have been applied, the body hooks are interengaged and locked into position by bumping using conventional procedures.

The side seam produced according to the present invention is extremely durable. The seam is capable of withstanding processing and pasteurization at elevated temperatures in the range of 240° to 260° F. as a direct result of the presence of the high modulus material. The high modulus adhesive also provides the mechanical strength and rigidity necessary to hold the can together. The low modulus sealant serves to fill in the voids between the metal layers exposed to the interior of the can thereby effectively sealing the contents therein. In addition, the low modulus material serves to protect the high modulus material from moisture attack by the container contents. Consequently, the side seam shows no adverse effects, such as leakage, even after extended storage times and prolonged exposure to the aqueous ingredients of the container.

The present invention will be more clearly understood from a reference to the attached drawings in which.

Figure 1:
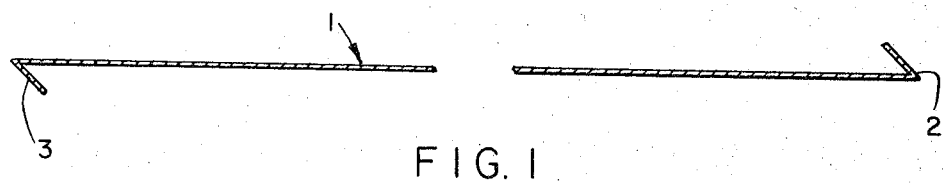
FIGURE 1 is a cross sectional view of a can body blank showing the opposed longitudinal edge portions of the blank reversely bent to form the body hooks.

Referring more particularly to the drawings, in FIGURE 1 a can body blank generally designated at 1 is shown having an upwardly directed body hook 2 and a downwardly directed body hook 3.

Figure 2:
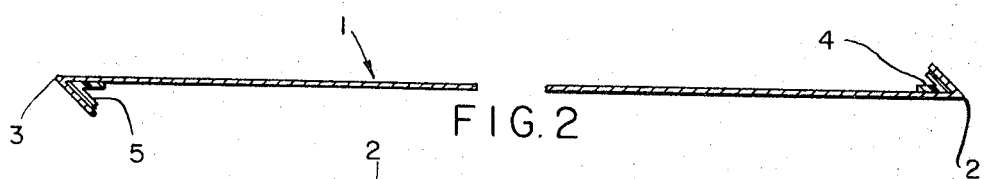
FIGURE 2 is a view similar to FIGURE 1 with the dual sealing system applied.

In FIGURE 2, a can body blank 1 is shown with a low modulus sealant 4 applied to the upwardly directed body hook 2 and a high modulus adhesive 5 applied to the downwardly directed body hook 3.

Figure 3:
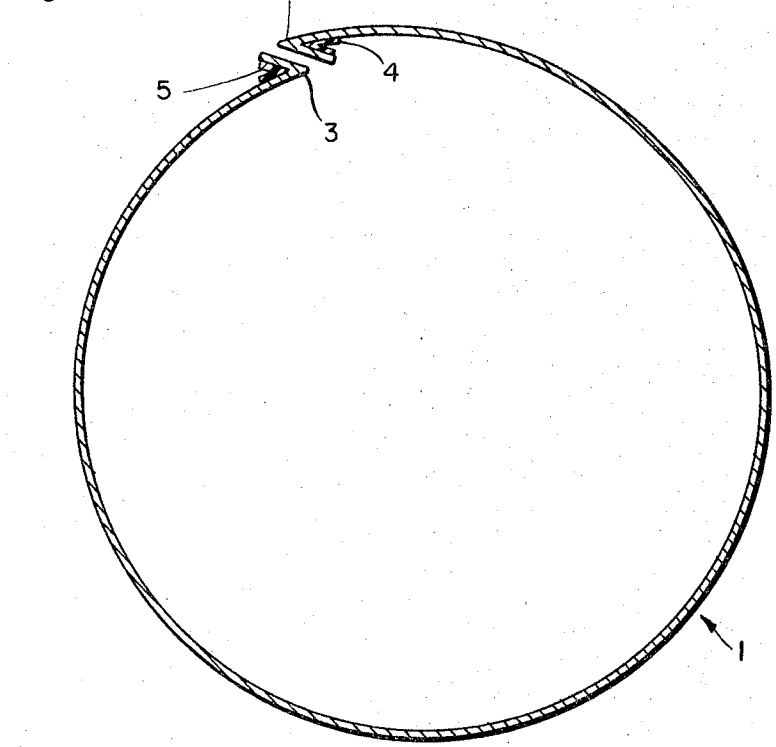
FIGURE 3 is a cross sectional view showing the can body blank of FIGURE 2 after bending into its final shape but prior to interengagement of the body hooks.

FIGURE 3 shows the body blank 1 bent into a generally circular shape incident to interengagement of the body hooks with the hook 2 carrying the low modulus sealant 4 in position as the external body hook and with the hook 3 carrying the high modulus adhesive 5 in position as the internal body hook.

Figure 4:
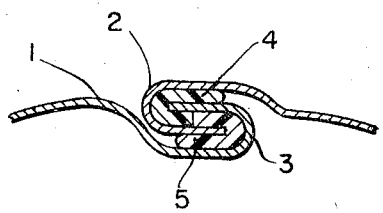
FIGURE 4 is an enlarged fragmentary end view of a portion of the can body of FIGURE 3 showing the completed side seam containing the dual sealing system.

FIGURE 4 shows the completed side seam of the body blank 1 after the external body hook 2 and the internal body hook 3 have been interengaged and locked together. The low modulus sealant 4 carried on hook 2 is located within the finished seam adjacent to the interior of the can while the high modulus adhesive 5 carried on hook 3 is located in the portion of the seam at the exterior surface of the can in contact with the atmosphere.

Low modulus sealants suitable for use in the dual side same seals include materials having a tensile modulus of 0 to about 200 pounds per square inch at 100 percent elongation, such as, polyol-cured polyurethanes, tacky polyisobutylenes having a molecular weight below about 100,000 e.g. "Vistanex LM" Type MS or MH and, low molecular weight polyamides. Suitable high modulus adhesives useful in combination with the low modulus sealant include materials having a tensile modulus of about 750 pounds per square inch or greater at 100 percent elongation such as, diamine-cured polyurethanes, adhesive vinyl chloride plastisols, a rubber blend of 50 parts by weight polyethylene and 50 parts by weight of ethylene-propylene rubber, and polyethylene cured with dibenzyl peroxide.

An example illustrating the improved sealing performance obtained with the dual sealing system of the present invention is as follows:

EXAMPLE (A) Several pairs of aluminum strips one inch wide and three inches long were adhered together with a thin layer (approximately 2 to 3 mils) of an adhesive comprising a cross-linked vinyl chloride plastisol having a tensile modulus of about 1000 pounds per square inch at 100 percent elongation ("Goodrich 540—55—151—1e").

(B) Several pairs of aluminum strips similar to those used in (A) were adhered together with a 2 to 3 mil layer of polyisobutylene having a molecular weight between about 8500 and 10,000 and a tensile modulus of about 100 pounds per square inch at 100 percent elongation.

(C) Other pairs of aluminum strips similar to those used in (A) and (B) were adhered together with a 2 to 3 mil layer of a two-part system consisting of the vinyl resin adhesive plastisol used in (A) and the polyisobutylene sealant used in (B). A thin layer of the plastisol was embedded in the polyisobutylene so that all surfaces of the plastisol were coated with the butylene polymer. Thereafter, two aluminum strips were adhered to opposite surfaces of the dual sealant which consisted of polyisobutylene having an inner core of adhesive plastisol.

The values for tensile modulus as reported and referred to herein were obtained on an Instron tester at a pull rate of 1 inch per minute using a sample of 30 mils thickness and ¼ inch wide and are based on the original thickness of the samples.

The laminates prepared in (A) through (C) were tested for peel strength after the strips and been adhered initially, after exposure to processing conditions similar to those ordinarily encountered in canning procedures, and after processing plus various storage times in water maintained at a temperature of about 100° F.

The samples were processed by immersing in water and heating at 240° F. for 20 minutes. In all cases the peel strength was measured on a Dillon Universal Testing Machine at room temperature and at a pull rate of twelve inches per minute. The results obtained under the various test conditions are set forth in the following table.

TABLE

| Test Conditions | Peel Value (lbs.) | | |
| --- | --- | --- | --- |
| | (A) | (B) | (C) |
| (1) Controls—no exposure. | 14½ to 18 | ½ to 1½ | 6 to 8. |
| (2) Processed 20 minutes at 240° F., cooled and tested. | 11 to 16 | ½ to 1½ | 6 to 8. |
| (3) Processed 20 minutes at 240° F., stored in 100° F. water for 5 days. | 3 to 5 | Not tested | Not tested. |
| (4) Processed 20 minutes at 240° F., stored in 100° F. water for 12 days. | 1½ to 2½ | ½ to 1½ | 6 to 8. |
| (5) Processed 20 minutes at 240° F., stored in 100° F. water for 30 days. | 1 to 2 | ½ to 1½ | 4 to 7. |

From the results given above, it is readily apparent that the bond formed by the adhesive plastisol is adversely affected when exposed to moisture, particularly over prolonged storage times. Though the adhesive plastisol initially forms a much stronger bond between the aluminum strips than the polyisobutylene, the strength of the plastisol bond decreases substantially in contact with water while the strength of the bond formed by the polyisobutylene when used alone. Moreover, it is appar- similar test conditions. When the adhesive plastisol and polyisobutylene are used together as a dual sealant, the combination possesses much greater bond strength after prolonged storage in water than either the plastisol or polyisobutylene when used alone. Moreover, it is apparent from the results shown in the table that the peel strength of the dual sealant decreases only very slightly after 30 days storage in warm water.

The dual side seam sealing system of the present invention is not only useful for aluminum cans but also may be used as a substitute for the tin-lead solder customarily employed for sealing the side seams of can bodies made from tinplate. Consequently, it is possible to provide cans lithographed over their entire circumference since there is no need for leaving an unlithographed area adjacent the exterior of the side seam which has been necessary when applying solder. Replacing solder with the dual sealing system of the present invention also obviates fluxing of the side seam area prior to soldering so that the can body is not subject to flux corrosion. In addition, application of the sealing system is rapid and economical and may be effected at low temperatures.

We claim:

1. A method of forming cemented can body side seams which comprises providing a can body blank having its opposed longitudinal edges reversely bent to form an external body hook and an internal body hook adapted for sealing engagement to form a side seam, applying a sealant having a tensile modulus of 0 to about 200 pounds per square inch at 100 percent elongation to the external body hook, applying an adhesive having a tensile modulus above about 750 pounds per square inch at 100 percent elongation to the internal body hook, interengaging said internal and external body hooks, and thereafter bumping the interengaged body hooks to lock said hooks together.

2. A method according to claim 1 wherein the sealant is a low molecular weight polyisobutylene.

3. A method according to claim 2 wherein the adhesive is a crosslinked vinyl chloride plastisol.

4. A method according to claim 3 wherein the body blank is aluminum metal.

References Cited by the Examiner
UNITED STATES PATENTS

| | | | |
|---|---|---|---|
| 1,180,661 | 4/1916 | Kruse | 113—120 |
| 2,346,619 | 4/1944 | Schrader | 113—120 |
| 3,125,056 | 3/1964 | Kaiser | 113—120 |

CHARLES W. LANHAM, *Primary Examiner.*

R. D. GREFE, *Assistant Examiner.*